Sept. 19, 1950     H. E. McGINNIS ET AL     2,523,040
TRAILER DOLLY

Filed Dec. 30, 1946     2 Sheets-Sheet 1

Inventors
Howard E. McGinnis, and
James J. Staffelbach
By Fishburn & Mullendore
Attorneys Inventors
Howard E. McGinnis, and
James J. Staffelbach.
By Fishburn & Mullendore
Attorneys Patented Sept. 19, 1950

2,523,040

UNITED STATES PATENT OFFICE 2,523,040

TRAILER DOLLY

Howard E. McGinnis and James J. Staffelbach, Wichita, Kans.

Application December 30, 1946, Serial No. 719,152

4 Claims. (Cl. 280—33.4)

This invention relates to dollies of the type adapted for supporting trailers for vehicles and is particularly adaptable for two or four wheel trailers.

Trailers are usually attached to the rear bumper of a vehicle and with the dollies or wheel structures heretofore in use, a considerable amount of the weight of the trailers have been carried by the rear of the vehicle, such as an automobile, and particularly with house trailers which run to considerable lengths.

It is the principal objects of the present invention to provide a dolly to relieve the automobile of excessive weight imposed by the trailer; to provide a dolly to prevent the trailer from swaying at high speed; to provide a dolly which will absorb the road shocks due to the unevenness of the road bed; to provide a device for relieving stresses and strains on the body and frame of the automobile; to provide a floating assembly for the front of the trailer; and to provide a device of this character simple, economical to manufacture and efficient in operation.

In accomplishing these and other objects of the invention hereinafter pointed out, we have provided improved structure, the preferred form of which is illustrated in the accompanying drawings wherein.

Referring more in detail to the drawings:

1 designates a dolly embodying the features of our invention comprising an axle 2 supported by wheels 3. The axle 2 comprises two short members 4 and 5 having a curved connecting member 6 welded or otherwise suitably secured to the short axles as indicated at 7 (Fig. 1), the member 6 being curved forwardly at substantially a twelve-inch radius from the point of the axles to permit a trailer jack used with the ordinary house trailers to be raised and lowered without interference by the dolly.

Figure 5:
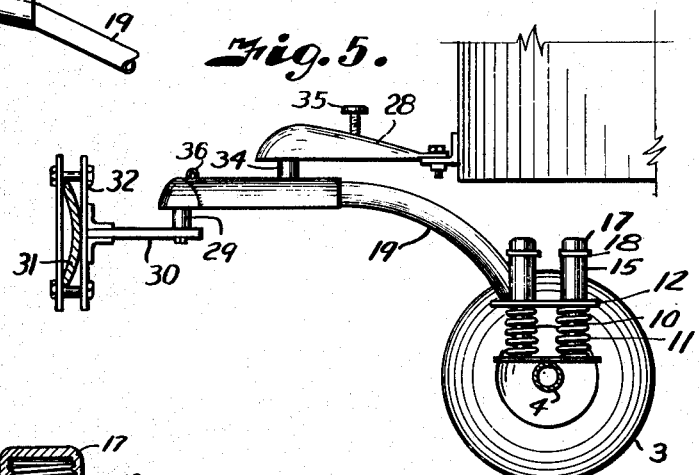
Fig. 5 is a section through a modified form of our invention particularly adapted for use with two-wheel and four-wheel tandem trailers, and illustrating the dolly attached to the trailer hitch.
Figure 6:
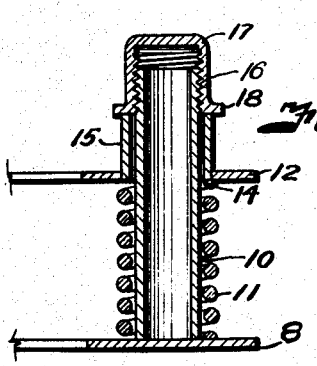
Fig. 6 is a vertical cross section showing the spring action of the dolly.

Welded or otherwise suitably secured to the axles 2 and 3 are plates 8 and 9. A plurality of vertically extending pipes or tubes 10 are welded to the top of the plates 8 and 9 adapted to accommodate coil springs 11. While any suitable number of tubes and coil springs may be utilized, we have here illustrated three on each plate 8 and 9. Plates 12 having a plurality of openings 14 are adapted to engage over the vertical tubes 10 and rest on the upper ends of the coil springs 11, the plates being adapted to slide up and down on the tubes 10. The plates are provided with upstanding tubular members 15 surrounding the openings 14 as best illustrated in Fig. 6. The tubes 10 are threaded at their upper ends as indicated at 16 adapted to receive internally screw threaded caps 17 having lateral annular flanges 18 adapted to engage the upstanding tubular members 15, also as best illustrated in Fig. 5.

Figure 1:
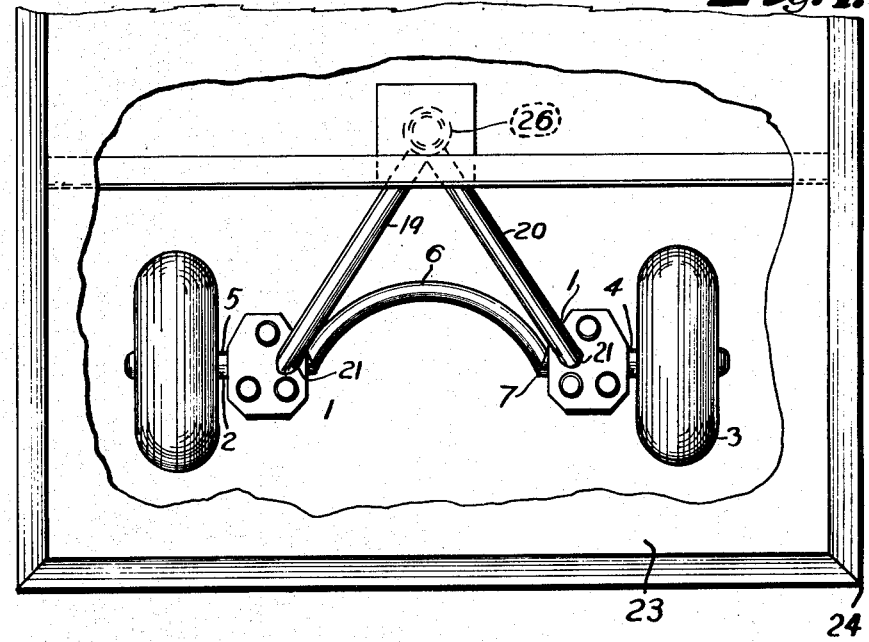
Fig. 1 is a top plan view of our invention, the attaching support being shown in dotted lines.
Figure 2:
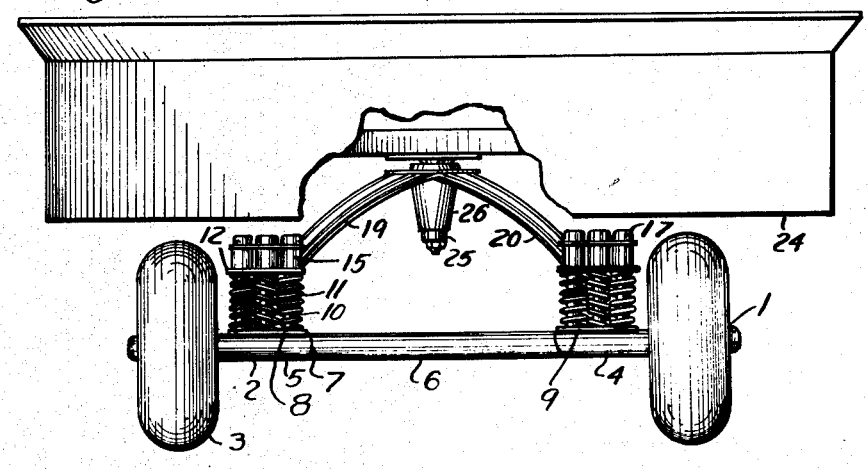
Fig. 2 is a rear view of the dolly with parts of the trailer broken away to better illustrate the invention.
Figure 3:
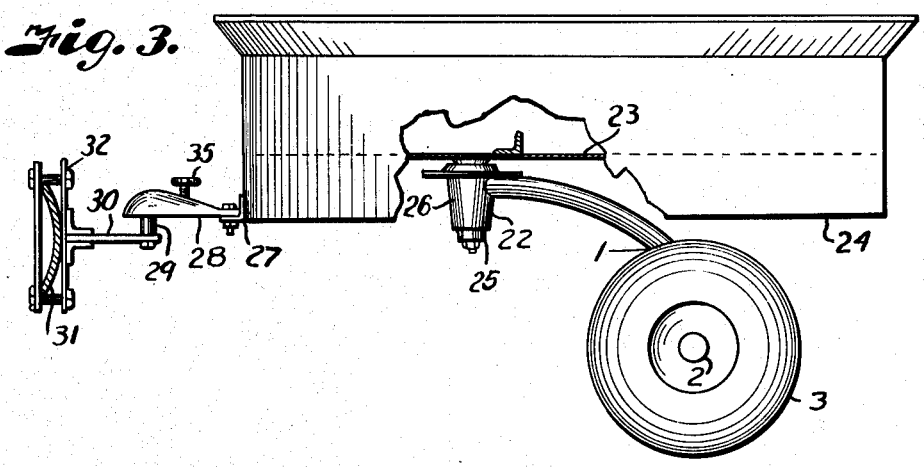
Fig. 3 is a side view of the dolly with parts of the trailer broken away and illustrating the attachment of the trailer to the vehicle.

Arms 19 and 20 are provided having their rear ends welded or otherwise suitably secured to the top plate 12 as indicated at 21 (Fig. 1). The arms are arched upwardly as best illustrated in Fig. 3 and terminate in a bearing 22 secured to the bottom 23 of a trailer 24. The bearing 22 comprises the usual roller bearing consisting of a shaft 25 secured to the bottom 23 in any suitable manner and having a housing 26 as is the usual practice, the bearing allowing the wheels to turn in any direction with respect to the trailer.

The forward end of the trailer 24 is provided with the usual trailer hitch consisting of a bracket 27 to which is attached an arm 28 having a socket (not shown) adapted to receive a ball (not shown) on the upper end of a pin 29 carried by an arm 30 attached to the bumper 31 of a vehicle by a clamp 32 also as is conventional practice.

In operation of a dolly constructed and assembled as described, the weight of the trailer will be transmitted through the arms 19 and 20 to the top plate 12 which will cause the weight of the load to be carried by the coil springs 11, the plate being slidable on the tube 10 to provide spring or knee action to the trailer through the dolly. Adjustment of the cap 17 on the tubular member 10 will provide the required tension on the spring. In other words, by loosening or tightening the cap the proper amount of tension is brought to bear on the spring to properly carry varying loads on the dolly.

The form of invention illustrated in Fig. 5 is the dolly particularly adapted for use with two-wheel and four-wheel tandem trailers, and is substantially the same as in the preferred form of the invention except that the dolly is connected to the arm 28 secured to the forward end of the trailer, the axles, plates and knee action arrangement being the same as in the preferred form and are numbered corresponding to those parts. The arms 19 and 20 are connected at their forward ends by welding or the like to a bracket member 33. The bracket is substantially V-shaped, the arm being connected to the respective corners of the wide end of the bracket. The bracket has an upstanding pin 34 substantially centrally thereof provided with a ball (not shown) adapted to be engaged by the socket of the arm 28 as in the preferred form of the invention. The forward portion of the bracket 24 is also provided with a socket adapted to engage a ball (not shown) of the pin 29 carried by the arm 30 of the clamp 32 attached to the bumper 31 of the vehicle, as in the preferred form of the invention.

In operation of this form of the invention the weight of the forward end of the trailer is transmitted directly to the dolly instead of the bumper of the vehicle, the main weight of the trailer proper being carried by the wheels (not shown).

Figure 4:
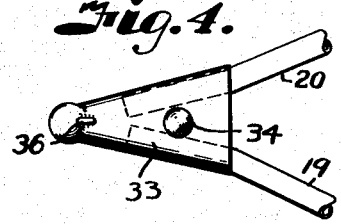
Fig. 4 is a plan view of the bracket of the modified form.

It will be understood that the trailer hitch 28 is provided with the usual connection as indicated by the hand screw 35 and the loop 36 (Fig. 4).

It will be obvious from the foregoing that we have provided an improved dolly for trailers having a spring and knee action for absorbing the road shock of a trailer while being towed by a vehicle as in ordinary practice.

What we claim and desire to secure by Letters Patent is:

1. A dolly adapted to be attached to the hitch on the forward end of a trailer for attachment to a vehicle comprising, an axle having a curved intermediate portion terminating in outwardly directed coaxial ends, wheels rotatably mounted on the ends of said axle for supporting the axle, plates fixed to said axle between the curved portion and said wheels, a plurality of spaced vertical members rigidly secured to each of said plates, coil springs sleeved on said members, plates having upwardly extending tubes slidably mounted on said vertical members, said springs supporting said last-named plates, means for adjusting the tension on said springs, arms having their rear ends rigidly secured to said last-named plates, a bracket connecting the forward ends of the arms, means on the bracket for attaching the dolly to the trailer hitch, and means for pivotally attaching the bracket to the vehicle.

2. In a trailer for vehicles having a hitch for attachment to said vehicle, a dolly adapted to be attached to said hitch comprising, an axle, wheels rotatably mounted on the ends of the axle for supporting the axle, said axle being curved forwardly at substantially the center thereof, plates secured to said axle between said forwardly curved portion and said wheels, vertical members rigidly secured to said plates, coil springs surrounding said members, plates adapted to rest on said springs and having upstanding tubes slidably mounted on said vertical members, adjustable means for retaining the last-named plates on said vertical members and providing tension on said springs, arms having their rear ends rigidly secured to said last-named plates, a bracket connecting the forward ends of the arms, means on the bracket for attaching the dolly to the trailer hitch, and means for pivotally attaching the bracket to the vehicle.

3. A dolly for supporting one end of a trailer comprising, an axle having an intermediate curved portion terminating in outwardly directed coaxial ends, wheels rotatably mounted on each of said coaxial ends for supporting the axle, plates fixed on the axle between the curved portion and the wheels, said plates being in a plane substantially parallel to an axial plane of the curved portion of the axle, a plurality of spaced guide members fixed on each of said plates and extending perpendicularly therefrom, sleeves slidably mounted on said guide members, means connecting the sleeves on the guide members of the respective plates and securing same together for unitary movement, springs on the plates and supporting the sleeves, means on the guide members limiting movement of the sleeves away from the plates, arms having ends fixed to the sleeve connecting means, means connecting the other ends of said arms, bearing means adjacent said other ends of the arms, means on the trailer pivotally mounted on said bearing means, and means spaced from the bearing means for pivotal attachment to a hitch of a towing vehicle.

4. A dolly for supporting one end of a trailer comprising, an axle having an intermediate curved portion terminating in outwardly directed coaxial ends, wheels rotatably mounted on each of said coaxial ends for supporting the axle, plates fixed on the axle between the curved portion and the wheels, said plates being in a plane substantially parallel to an axial plane of the curved portion of the axle, a plurality of spaced guide members fixed on each of said plates and extending perpendicularly therefrom, sleeves slidably mounted on said guide members, plate means connecting the sleeves on the guide members of the respective plates and securing said sleeves together for unitary movement, springs on the plates and supporting the sleeves, means on the guide members limiting movement of the sleeves away from the plates, arms having ends fixed to said plate means, means connecting the other ends of said arms, bearing means adjacent said other ends of the arms, means on the trailer pivotally mounted on said bearing means, and means adjacent the ends of the arms and spaced from the bearing means for pivotal attachment to a hitch of a towing vehicle.

HOWARD E. McGINNIS.
JAMES J. STAFFELBACH.

REFERENCES CITED

The following references are of record in the file of this patent:

UNITED STATES PATENTS

| Number | Name | Date |
|---|---|---|
| 1,007,120 | Leech | Oct. 31, 1911 |
| 2,123,388 | Viguerie | July 2, 1938 |
| 2,309,204 | Nelson | Jan. 26, 1943 |
| 2,316,702 | McDaniel | Apr. 13, 1943 |